(12) United States Patent
Kim

(10) Patent No.: US 8,288,036 B2
(45) Date of Patent: Oct. 16, 2012

(54) SECONDARY BATTERY AND METHOD OF MAKING THE SECONDARY BATTERY

(75) Inventor: Daekyu Kim, Suwon-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 432 days.

(21) Appl. No.: 12/554,528

(22) Filed: Sep. 4, 2009

(65) Prior Publication Data

US 2010/0291432 A1  Nov. 18, 2010

Related U.S. Application Data

(60) Provisional application No. 61/179,266, filed on May 18, 2009.

(51) Int. Cl.
*H01M 2/02* (2006.01)
*H01M 2/10* (2006.01)
*H01M 2/16* (2006.01)

(52) U.S. Cl. .................. 429/186; 429/163; 429/247

(58) Field of Classification Search .................. 429/162, 429/144, 130, 129, 127, 247, 163, 186
See application file for complete search history.

(56) References Cited

U.S. PATENT DOCUMENTS

| | | | |
|---|---|---|---|
| 4,957,833 | A | 9/1990 | Daifuku et al. |
| 6,743,546 | B1 * | 6/2004 | Kaneda et al. ............... 429/127 |
| 2003/0068562 | A1 | 4/2003 | Kim et al. |
| 2003/0148174 | A1 | 8/2003 | Gu |
| 2004/0265702 | A1 | 12/2004 | Kim |
| 2006/0154138 | A1 | 7/2006 | Miyamoto et al. |
| 2006/0172190 | A1 | 8/2006 | Kaplin et al. |
| 2006/0251962 | A1 | 11/2006 | Kim |
| 2006/0257724 | A1 | 11/2006 | Kwon et al. |
| 2007/0119047 | A1 | 5/2007 | Gu |
| 2007/0154787 | A1 | 7/2007 | Jang et al. |
| 2008/0102354 | A1 * | 5/2008 | Lee ............................ 429/94 |
| 2008/0152997 | A1 | 6/2008 | Lee |
| 2008/0233474 | A1 | 9/2008 | Son et al. |
| 2009/0297929 | A1 | 12/2009 | Uchida |

FOREIGN PATENT DOCUMENTS

DE  43 27 293 A1  3/1994

(Continued)

OTHER PUBLICATIONS

"Rubber Polymers", Charles E. Ophardt, Virtual Chembook, Elmhurst College, 2003.*

(Continued)

*Primary Examiner* — Jonathan Crepeau
*Assistant Examiner* — Kenneth Douyette
(74) *Attorney, Agent, or Firm* — Knobbe, Martens, Olson & Bear LLP

(57) ABSTRACT

A secondary battery and a manufacturing method thereof are disclosed. In one embodiment, the secondary battery includes 1) an electrode assembly having an outer surface, 2) a sealing tape attached to and surrounding at least part of the outer surface of the electrode assembly and 3) a can accommodating the electrode assembly and sealing tape. The sealing tape includes i) an adhesive layer contacting the outer surface of the electrode assembly and ii) a base layer formed on and at least partially covering the adhesive layer. The base layer contacts an inner surface of the can. At least part of the adhesive layer is not covered by the base layer.

18 Claims, 11 Drawing Sheets

FOREIGN PATENT DOCUMENTS

| | | |
|---|---|---|
| EP | 1717879 | 11/2006 |
| EP | 1804320 | 7/2007 |
| EP | 2019442 | 1/2009 |
| GB | 1 385 910 | 3/1975 |
| JP | 06-150971 | 5/1994 |
| JP | 10-302751 (A) | 11/1998 |
| JP | 2000-133220 (A) | 5/2000 |
| JP | 2001-273933 | 10/2001 |
| JP | 2003-151634 (A) | 5/2003 |
| JP | 2004228078 A * | 8/2004 |
| JP | 2005-019409 (A) | 1/2005 |
| JP | 2005-126452 (A) | 5/2005 |
| JP | 2006-310281 (A) | 11/2006 |
| JP | 2007-184238 (A) | 7/2007 |
| JP | 2008-19311 (A) | 1/2008 |
| JP | 2008-529239 (A) | 7/2008 |
| JP | 2009-021251 (A) | 1/2009 |
| KR | 10-2003-0066959 (A) | 8/2003 |
| KR | 10-2007-0025722 (A) | 3/2007 |
| KR | 10-0719725 B1 | 5/2007 |
| KR | 10-0719725 (B1) | 5/2007 |
| KR | 10-2007-0096649 A | 10/2007 |
| KR | 10-2007-0096649 (A) | 10/2007 |
| KR | 10-2008-0057977 A | 6/2008 |
| KR | 10-2009-0007074 (A) | 1/2009 |

OTHER PUBLICATIONS

Korean Office Action dated Oct. 11, 2011 for Korean Patent Application No. KR 10-2009-0119812 which corresponds to captioned U.S. Appl. No. 12/554,528.

Office Action dated Feb. 15, 2011 for related U.S. Appl. No. 12/554,504, filed Sep. 4, 2009.

Office Action dated Mar. 24, 2011 for related U.S. Appl. No. 12/626,157, filed Nov. 25, 2009.

Notice of Allowance dated Jul. 5, 2011 for U.S. Appl. No. 12/554,504, filed Sep. 4, 2009, which is related to captioned U.S. Appl. No. 12/554,528.

European Search Report dated Aug. 18, 2010 for EP Application No. 09252269.7.

European Search Report dated Dec. 13, 2011 for European Patent Application No. EP 11 250 367.7 corresponding to U.S. Appl. No. 13/033,970, filed Feb. 24, 2011, which is related to captioned U.S. Appl. No. 12/554,528.

Korean Notice of Allowance dated Jan. 19, 2002 for Korean Patent Application No. KR 10-2010-0011079 corresponding to U.S. Appl. No. 12/626,157, filed Nov. 25, 2009, now U.S. Patent No. 8,062,787, Issued Nov. 22, 2011, which is related to captioned U.S. Appl. No. 12/554,528.

Office Action dated Apr. 18, 2012 for U.S. Appl. No. 12/831,975, filed Jul. 7, 2010, which is related to captioned U.S. Appl. No. 12/554,528.

European Search Report dated Sep. 10, 2010 for European Patent Application No. EP 10 25 1224.1 which corresponds to U.S. Appl. No. 12/831,975, filed Jul. 7, 2010, which is related to captioned U.S. Appl. No. 12/554,528.

Korean Office Action dated Aug. 25, 2011 for Korean Patent Application No. KR 10-2010-0047292 which corresponds to U.S. Appl. No. 12/831,975, filed Jul. 7, 2010, which is related to captioned U.S. Appl. No. 12/554,528.

Japanese Office Action dated Aug. 7, 2012 for Japanese Patent Application No. JP 2010-012022 which claims priority from captioned U.S. Appl. No. 12/554,528.

* cited by examiner

SECONDARY BATTERY AND METHOD OF MAKING THE SECONDARY BATTERY

RELATED APPLICATIONS

This application claims priority to and the benefit of Provisional Patent Application No. 61/179,266 filed on May 18, 2009 in the U.S Patent and Trademark Office, the entire contents of which are incorporated herein by reference.

This application relates to U.S. patent application entitled "SECONDARY BATTERY AND METHOD OF MAKING THE SECONDARY BATTERY" Ser. No. 12/554,504, which is concurrently filed as this application and incorporated herein by reference in their entirety.

BACKGROUND OF THE INVENTION

1. Field of the Invention

An aspect of the present invention relates to a secondary battery and manufacturing method of the same.

2. Description of the Related Technology

A secondary battery is generally manufactured by accommodating an electrode assembly having a positive electrode plate, a negative electrode plate, and a separator interposed therebetween into a can together with an electrolyte.

A secondary battery is classified into a cylinder type secondary battery and a polygonal type secondary battery according to a shape of a can. The cylinder type secondary battery is manufactured by accommodating a cylindrical electrode assembly into a cylindrical can.

SUMMARY OF CERTAIN INVENTIVE ASPECTS

One aspect of the present invention is a secondary battery which can prevent an electrode assembly of the battery from moving in a can and a method of manufacturing the same.

Another aspect of the present invention is a secondary battery including: i) an electrode assembly, ii) a sealing tape adhered to a circumferential surface of the electrode assembly and having an adhesive layer and a base material and iii) a can to accommodate the electrode assembly to which the sealing tape adheres, wherein the base material of the sealing tape is shrunk by heat.

Another aspect of the present invention is a method of manufacturing a secondary battery including: i) accommodating an electrode assembly in which a sealing tape having an adhesive layer and a base material is adhered to a circumferential surface of the electrode assembly into a can and ii) heating the assembled secondary battery to shrink the base material of the sealing tape.

Another aspect of the invention is a secondary battery, comprising: 1) an electrode assembly comprising an outer surface, 2) a sealing tape attached to and surrounding at least part of the outer surface of the electrode assembly, wherein the sealing tape comprises i) an adhesive layer contacting the outer surface of the electrode assembly and ii) a base layer formed on and at least partially covering the adhesive layer and 3) a can accommodating the electrode assembly and sealing tape, wherein the base layer contacts an inner surface of the can, wherein at least part of the adhesive layer is not covered by the base layer.

In the above battery, the base layer comprises a portion which is thicker than the remaining portion of the base layer. In the above battery, the adhesive layer comprises two opposing ends, and wherein at least one of the ends is not covered by the base layer. In the above battery, the two ends of the adhesive layer are positioned along a winding direction of the electrode assembly. In the above battery, the two ends of the adhesive layer are positioned along a direction substantially perpendicular to a winding direction of the electrode assembly.

In the above battery, at least a portion of the adhesive layer which is not covered by the base layer contacts both i) the inner surface of the can and ii) the outer surface of the electrode assembly. In the above battery, the base layer comprises at least one of the following: polyethylene terephthalate (PET), polypropylene (PP) and polystyrene (PS). In the above battery, the base layer has a property of thermal shrinkage. In the above battery, the sealing tape covers a finishing part of the electrode assembly.

Another aspect of the invention is a secondary battery, comprising: 1) an electrode assembly comprising an outer surface, 2) a sealing tape attached to and surrounding at least part of the outer surface of the electrode assembly, wherein the sealing tape comprises i) an adhesive layer contacting the outer surface of the electrode assembly and ii) a base layer formed on the adhesive layer, wherein the adhesive layer comprises a plurality of sub-adhesive layers which are separated by a first plurality of slits, wherein the base layer comprises a plurality of sub-base layers which are separated by a second plurality of slits which are substantially aligned with the first plurality of slits, respectively, and wherein each sub-base layer comprises two opposing ends and 3) a can accommodating the electrode assembly and sealing tape, wherein the base layer contacts an inner surface of the can.

In the above battery, at least one of the second plurality of slits is wider than the first plurality of slits. In the above battery, each sub-base layer is more curved toward the can or electrode assembly than the corresponding sub-adhesive layers. In the above battery, the base layer has a property of thermal shrinkage. In the above battery, at least part of each sub-base layer contacts the inner surface of the can with greater force than the remaining portion of the respective sub-base layer. In the above battery, each of the sub-base layers is configured to shrink by heat substantially more than the sub-adhesive layers.

In the above battery, the base layer comprises at least one of the following: polyethylene terephthalate (PET), polypropylene (PP) and polystyrene (PS). In the above battery, the first and second plurality of slits are substantially perpendicular to a winding direction of the electrode assembly. In the above battery, the first and second plurality of slits are substantially parallel with a winding direction of the electrode assembly.

Another aspect of the invention is a method of manufacturing a secondary battery, comprising: 1) providing i) an electrode assembly comprising an outer surface, ii) a sealing tape attached to and surrounding at least part of the outer surface of the electrode assembly, wherein the sealing tape comprises an adhesive layer and a base layer formed on and at least partially covering the adhesive layer, and wherein the base layer has a property of thermal shrinkage, and iii) a can configured to receive the electrode assembly and sealing tape, 2) placing the electrode assembly and the sealing tape into the can so as to form an assembled secondary battery, wherein the base layer contacts an inner surface of the can, and wherein the adhesive layer contacts the outer surface of the electrode assembly and 3) heating the assembled secondary battery so that the base layer shrinks and at least one end of the adhesive layer is not covered by the base layer.

In the above method, the heating is performed by an aging process of the secondary battery. In the above method, the aging process is performed by exposing the assembled battery to an environment having a temperature from about 50° C. to about 70° C. for about 18 hours to about 36 hours.

Still another aspect of the invention is a method of manufacturing a secondary battery, comprising: 1) providing i) an electrode assembly comprising an outer surface, ii) a sealing tape attached to and surrounding at least part of the outer surface of the electrode assembly, and iii) a can configured to receive the electrode assembly and sealing tape, wherein the sealing tape comprises i) an adhesive layer and ii) a base layer formed on the adhesive layer, wherein the adhesive layer comprises a plurality of sub-adhesive layers which are separated by a first plurality of slits, and wherein the base layer comprises a plurality of sub-base layers which are separated by a second plurality of slits which are substantially aligned with the first plurality of slits, respectively, 2) placing the electrode assembly and the sealing tape into the can so as to form an assembled secondary battery, wherein the base layer contacts an inner surface of the can, and wherein the adhesive layer contacts the outer surface of the electrode assembly and 3) heating the assembled secondary battery so that i) each of the sub-base layer shrinks and is more curved toward the can or electrode assembly than the corresponding sub-adhesive layers and ii) at least one of the second plurality of slits becomes wider than the first plurality of slits.

In the above method, the heating is performed by an aging process of the secondary battery. In the above method, the aging process is performed by exposing the assembled battery to an environment having a temperature from about 50° C. to about 70° C. for about 18 hours to about 36 hours.

DETAILED DESCRIPTION OF CERTAIN INVENTIVE EMBODIMENTS

A cylindrical electrode assembly accommodated in a cylindrical can often rotates and moves freely within the can due to external vibration or shock. The movement increases internal resistance of a battery and breaks electrode tabs of the electrode assembly.

Hereinafter, exemplary embodiments of the present invention will be described in detail in conjunction with the accompanying drawings.

Figure 1:
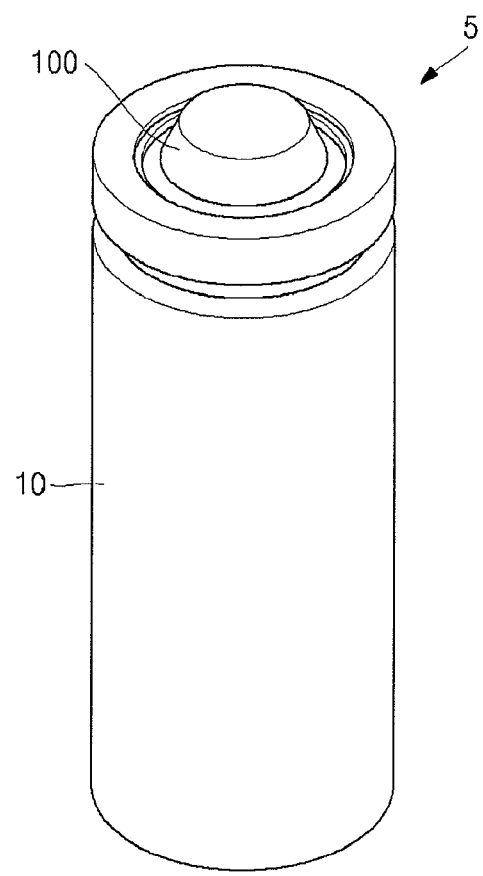
FIG. 1 is a perspective view illustrating a secondary battery according to an embodiment of the present invention.
Figure 2:
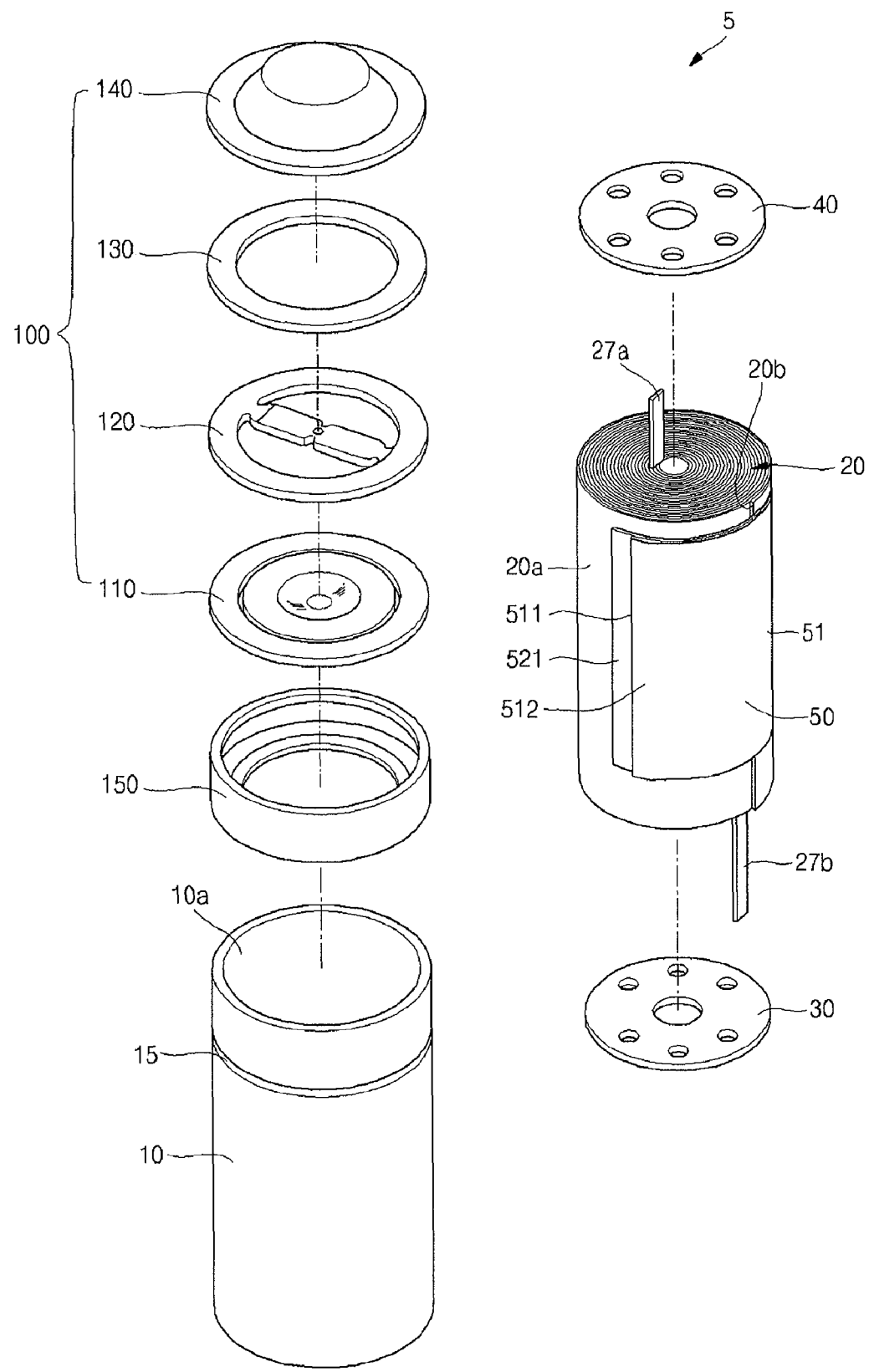
FIG. 2 is an exploded perspective view illustrating the secondary battery in FIG. 1.

FIG. 1 is a perspective view illustrating a secondary battery according to an embodiment of the present invention. FIG. 2 is an exploded perspective view illustrating the secondary battery in FIG. 1, FIG. 3 is a vertical sectional view illustrating the secondary battery in FIG. 1, and FIG. 4A is a horizontal sectional view illustrating the secondary battery in FIG. 1.

Referring to FIGS. 1 to 4, a secondary battery 5 includes a can 10, an electrode assembly 20, a sealing tape 50, and a cap assembly 100. The secondary battery 5 further includes a bottom insulator 30 and a top insulator 40. In one embodiment, the secondary battery 5 is a cylinder type secondary battery. In another embodiment, the secondary battery 5 may be other type secondary battery. For example, the cross-section of the secondary battery has a polygonal shape. For convenience, a cylinder type secondary battery will be described.

The cylindrical can 10 may be made of a lightweight electrically conductive material such as aluminum or an aluminum alloy and may be manufactured by a manufacturing method such as deep drawing. Referring to FIG. 3, the can 10 includes a circular bottom plate 12 and a cylindrical side wall 13 extended from the edge of the bottom plate 12. A beading portion 15 protrudes inwardly along the upper side of the side wall 13. The bottom insulator 30, the electrode assembly 20, and the top insulator 40 are sequentially positioned between the bottom plate 12 and the beading portion 15. The beading portion 15 prevents the bottom insulator 30, the electrode assembly 20, and the top insulator 40 from moving in a direction substantially perpendicular to the bottom plate 12 in the can 10. A crimping portion 16 is formed on an upper portion of the side wall 13. The cap assembly 100 is positioned between the crimping portion 16 and the beading portion 15. The crimping portion 16 seals a space between the can 10 and the cap assembly 100. An opening 10a is formed at the top thereof through which the bottom insulator 30, the electrode assembly 20, the top insulator 50, and the cap assembly 100 are sequentially inserted into the can 10 (See FIG. 3).

Figure 3:
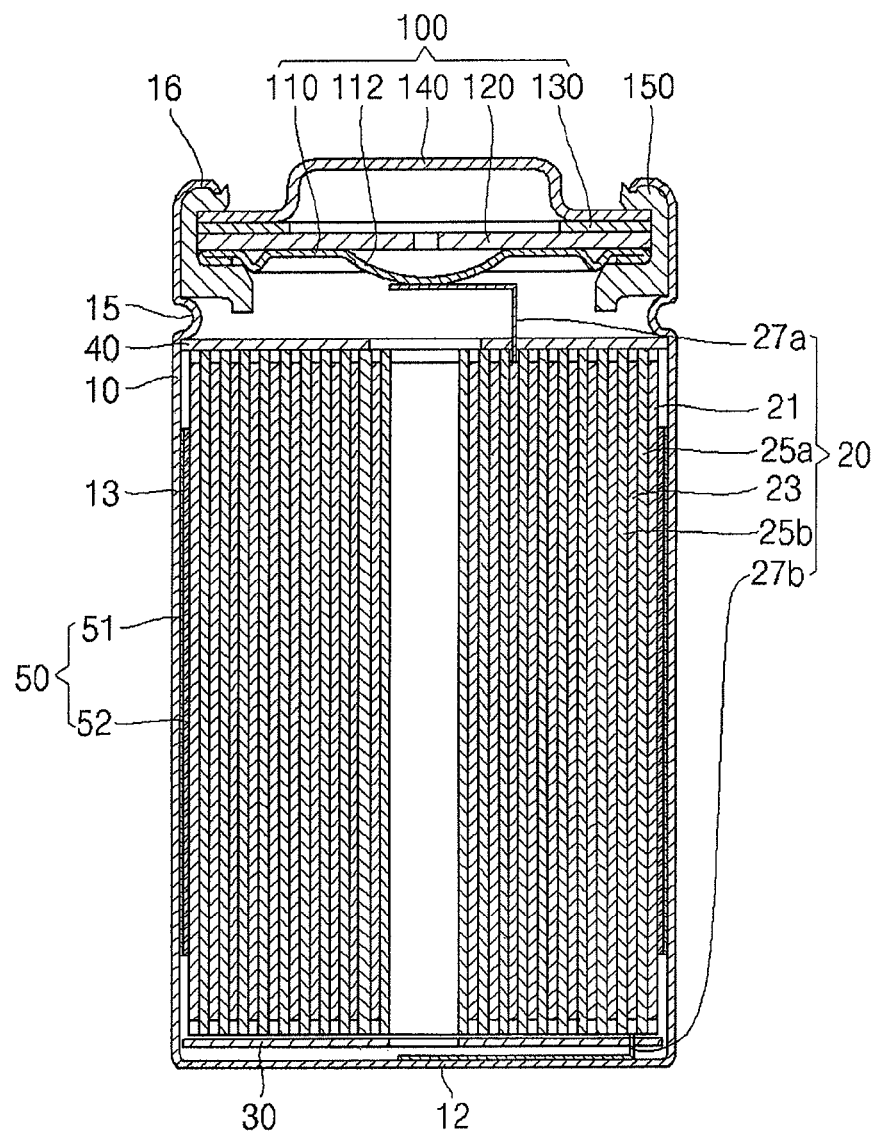
FIG. 3 is a vertical sectional view illustrating the secondary battery in FIG. 1.
Figure 4A:
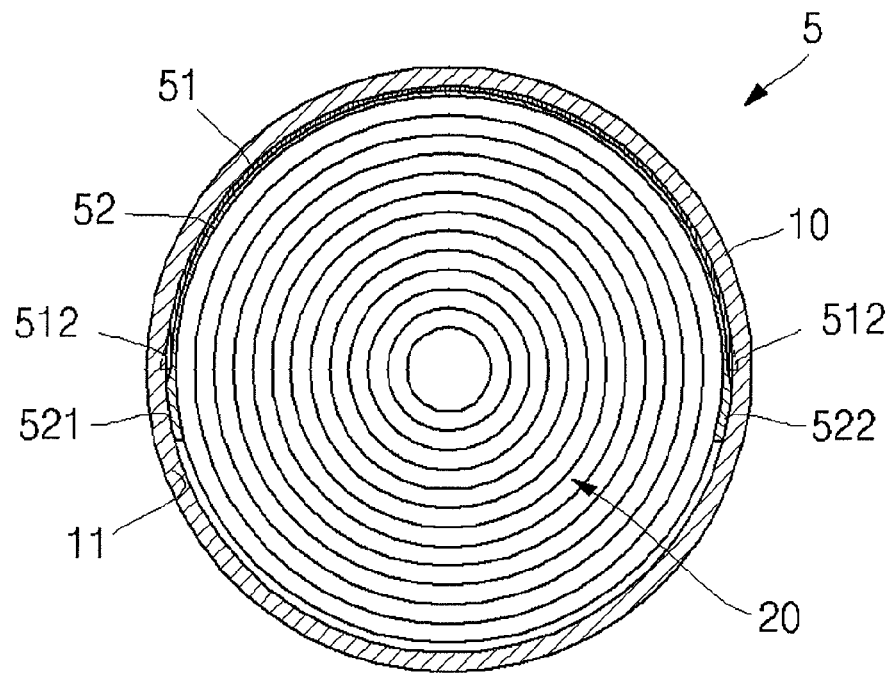
FIG. 4A is a horizontal sectional view illustrating the secondary battery in FIG. 1.

Referring to FIG. 3, the electrode assembly 20 includes a first electrode plate 25a, a second electrode plate 25b, a first separator 21, and a second separator 23. The electrode assembly 20 further includes a first electrode tab 27a and a second electrode tab 27b. The electrode assembly 20 may be made by disposing the two electrode plates 25a and 25b between the two separators 21 and 23 and then by winding the electrode plates 25a and 25b and the separators 21 and 23 into a cylinder. In one embodiment, the first electrode plate 25a is a positive electrode plate and the second electrode plate 25b is a negative electrode plate. In another embodiment, the second electrode plate 25b may be a positive electrode plate and the first electrode plate 25a may be a negative electrode plate. Although not illustrated in detail, the first electrode plate 25a as a positive electrode plate may include a positive electrode collector and a positive electrode active material coating portion. The positive electrode collector may be made of an electrically conductive metallic material to collect and move electrons from the positive electrode coating portion to an external circuit. In one embodiment, the positive electrode active material coating portion is a mixture of a positive electrode active material, an electrically conductive material, and a binder and is coated on the positive electrode collector. A first non-coating portion without coating a positive electrode active material may be formed on both ends of the first electrode plate 25a in the winding direction. The first electrode tab 27a as a positive electrode tab may be coupled to the first non-coating portion by welding and extends from the inside of the can 10 to toward the opening 10a.

Although not illustrated in detail, the second electrode plate 25b as a negative electrode plate may include a negative electrode collector and a negative electrode active material coating portion. The negative electrode collector may be made of an electrically conductive metallic material to collect and move electrons from the negative electrode coating portion to an external circuit. In one embodiment, the negative electrode active material coating portion is a mixture of a negative electrode active material, an electrically conductive material, and a binder and is coated on the negative electrode collector. A second non-coating portion without coating a negative electrode active material may be formed on both ends of the second electrode plate 25b in the winding direction. The second electrode tab 27b as a negative electrode tab may be coupled to the second non-coating portion by welding and extends from the inside of the can 10 toward the bottom plate 12. The second electrode tab 27b may be welded to the bottom plate 12 of the can 10. By doing so, the can 10 has a negative polarity and especially the bottom plate 12 of the can 10 is used as a negative terminal of the secondary battery 5.

The first and second separators 21 and 23 are interposed between the first and second electrode plates 25a and 25b in the wound electrode assembly 20 to separate the first electrode plate 25a and the second electrode plate 25b from each other. Fine porosities may be formed in the first and second separators 21 and 23 such that lithium ions pass therethrough between the two electrode plates 25a and 25b. The first and second separators 21 and 23 may be made of a polymeric material such as polyethylene (PE) or polypropylene (PP).

The circular bottom insulator 30 is positioned between the electrode assembly 20 and the bottom plate 12 of the can 10 for insulation. The circular top insulator 40 is positioned between the electrode assembly 20 and the beading portion 15 of the can 10 for insulation.

The sealing tape 50 includes a base material (or base layer) 51 and an adhesive layer 52 coated (or formed) on the base material 51. The sealing tape 50 is adhered to a circumferential surface 20a of the wound electrode assembly 20 and prevents the electrode assembly 20 from being released.

The base material 51 may be a film to support the adhesive layer 52. In one embodiment, the base material 51 is positioned to cover at least some of a finishing part 20b formed on the circumferential surface 20a of the wound electrode assembly 20. Any material which shrinks under a certain condition may be used as the base material 51. In one embodiment, the base material 51 has a property of thermal shrinkage. A polyethylene terephthalate (PET) may be used for the base material 51. Some of PET which does not have a property of thermal shrinkage may not be used. Polypropylene (PP) or polystyrene (PS) in addition to PET may be used for the base material 51. In one embodiment, in order to reinforce the thermal shrinkage, the base material 51 is elongated in a direction and an adhesive layer 52 is coated on the elongated base material 51. By doing so, when the base material 51 is heated, the base material 51 is more easily shrunk in the elongation direction. FIG. 2 illustrates an example of the sealing tape 51 adhered to the electrode assembly 20 such that the elongation direction of the base material 51 becomes the circumferential direction (hereinafter to be interchangeably used with "winding direction") of the electrode assembly 20.

In one embodiment, as shown in FIGS. 2 and 4, both ends 511 of the base material 51 are shrunk in the winding direction by heating the base material 51 so that the shrunk portions 512 become thick. As a result, a friction force between the base material 51 and an inner surface 11 of the side wall 13 of the can 10 increases to prevent the electrode assembly 20 from freely moving inside the can 10. The method of shrinking the base material 51 will be described in more detail in a manufacturing method of the secondary battery described later.

The adhesive layer 52 adheres to cover the finishing part 20b formed on the circumferential surface 20a of the wound electrode assembly 20 to prevent the wound electrode assembly 20 from being released (See FIG. 2). The adhesive layer 52 may be formed by coating an adhesive such as an acrylic adhesive on the base material 51. The adhesive layer 52 has exposed portions 521 that are not covered by the base material 51 but are exposed. The exposed portions 521 are formed outside ends 511 of the sealing tape 50 in the winding direction of the electrode assembly 20. In one embodiment, at least part of the exposed portions 521 are adhered to the inner surface 11 of the side wall 13 of the can 10 to prevent the electrode assembly 20 from freely moving inside the can 10.

In one embodiment, a safety vent 110, a current interrupt device (CID) 120, a Positive Temperature Coefficient (PTC) member 130, and a cap-up 140 are sequentially placed on the cap assembly 100 in the direction far from the electrode assembly 20.

A protrusion 112 protruding from the central area of the safety vent 110 to the electrode assembly 10 is electrically connected to the first electrode tab 27. When an internal pressure of the secondary battery 5 exceeds a reference pressure, the protrusion 112 is reversely deformed. The safety vent 110 electrically connects the first electrode tab 27 to the CID 120.

The CID 120 electrically connects the safety vent 110 to the PTC member 130. The CID 120 is broken by the reverse deformation of the protrusion 112 of the safety vent 110 due to an increased inner pressure of the secondary battery 5 to break the electrical connection between the safety vent 110 and the PTC member 130.

The PTC member 130 is a device whose electrical resistance is sharply increased when temperature thereof increases. The PTC member 130 electrically connects the CID 120 to the cap-up 140. When the battery is over heated, the electrical resistance of the PTC member 130 rapidly increases to break a flow of the current.

The cap-up 140 is electrically connected with the PTC member 130 and exposed to the exterior. The cap-up 140 serves as a positive terminal of the secondary battery 5.

The cap assembly 100 is insulated from the can 10 by an insulation gasket 150. The insulation gasket 150 surrounds the circumference of the cap assembly 100 and is fixed by the beading portion 15 and the crimping portion 16 in the can 10.

Hereinafter, a method of manufacturing the secondary battery illustrated in FIGS. 1 to 4 will be described in detail.

A method of manufacturing a secondary battery 10 includes assembling the secondary battery (S1) and heating the assembled second battery (S2).

In the assembling of the secondary battery (S1), respective components of the secondary battery are assembled with each other. The assembling procedure (S1) may include two sub-procedures: i) providing an electrode assembly, a sealing tape and a can and ii) placing the electrode assembly and the sealing tape into the can so as to form an assembled secondary battery.

Figure 5:
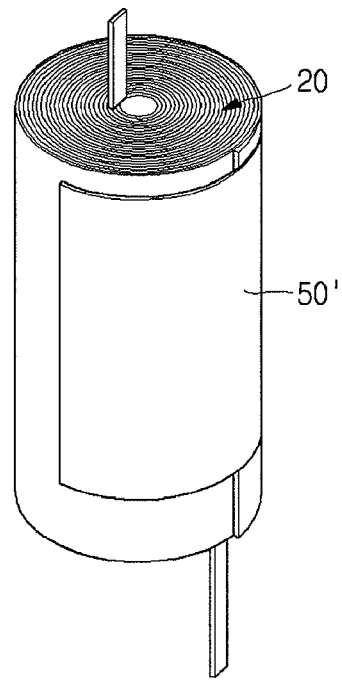
FIG. 5 is a perspective view illustrating an electrode assembly adhered with a sealing tape of FIG. 2 before heating.
Figure 6:
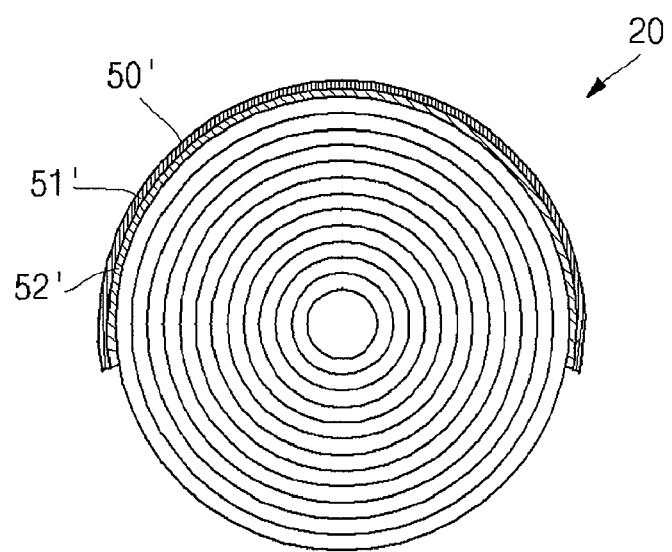
FIG. 6 is a horizontal sectional view illustrating the sealing tape in FIG. 5.

The assembling of the secondary battery (S1) will be described with reference to FIGS. 2 to 6. FIGS. 5 and 6 illustrate the electrode assembly 20 to which a sealing tape 50' adheres before the heating of the assembled second battery (S2).

Firstly, referring to FIGS. 2 and 5, when the bottom insulator 30, the electrode assembly 20 to which the sealing tape 50' adheres, and the top insulator 40 are placed in order from the bottom, the second electrode tab 27b of the electrode assembly 20 is coupled to the bottom plate 12 of the can 10 by, for example, welding. At this time, the beading portion 15 and the crimping portion 16 are not formed on the can 10.

The bottom insulator 30, the electrode assembly 20 to which the sealing tape 50' is adhered, and the top insulator 40 are sequentially inserted into the can 10 through the opening 10a of the can 10. In this case, the exposed portions 521 are not formed on the sealing tape 50' adhered to the electrode assembly 20' as shown in FIGS. 3 and 4. A base material 51' (See FIG. 6) for the sealing tape 50' may be made of a thermal shrinkage material such as PET, PP, and PS. In one embodiment, the base material 51' is made of PET. Referring to FIGS. 5 and 6, the sealing tape 50' in which an adhesive layer 52' is coated on the elongated base material 51' is used to be more easily shrunk in the heating of the assembled second battery (S2). The sealing tape 50' is adhered to the electrode assembly 20' such that the base material 51' is elongated in the circumferential direction of the cylindrical electrode assembly 20.

Referring to FIGS. 2 and 3, the beading portion 15 is formed on the side wall 13 of the can 10 to prevent the bottom insulator 30, the electrode assembly to which the sealing tape 50' adheres, and the top insulator 40 from moving in a direction substantially perpendicular to the bottom plate 12 in the can 10. Thereafter, an electrolyte is injected into the can 10. The electrolyte enables lithium ions generated from the electrodes 25a and 25b by electrochemical reactions to move during the charging and discharging.

Referring to FIGS. 2 and 3, the insulation gasket 150 is inserted into the can 10 through the opening 10a of the can 10 and then is put on the beading portion 15. The cap assembly 100 is placed inside the insulation gasket 150. The crimping portion 16 is formed on the top of the side wall 13 of the can 10 to fix the insulation gasket 150 and the cap assembly 100.

In the heating (S2), the assembled secondary battery is heated. In the heating (S2), the base material 51' of the sealing tape 50' (See FIG. 5) is shrunk in the elongation direction so that the exposed portions 521 of the adhesive layer 52 are formed outside the ends 511 the base material 51 of the sealing tape 50 in the circumferential direction of the base material 51, as illustrated in FIGS. 2 to 4. The exposed portions 521 of the adhesive layer 52 adhere to an inner surface of the side wall 13 of the can 10. Therefore, the free movement of the electrode assembly 20 is restricted in the can 10.

The heating (S2) may be carried out by a separate heating process. In one embodiment, the heating (S2) is carried out by an aging process, that is, an after-treatment process generally following the assembling of the secondary battery. The lithium-ion secondary battery generally undergoes forming and aging processes after the secondary battery is assembled. In the forming, the secondary battery is activated by charging and discharging the assembled secondary battery repeatedly. In the forming process, lithium ions generated from a lithium metal oxide used as a positive electrode for charging move toward a carbon electrode used as a negative electrode. The lithium ions are so reactive that compounds such as lithium carbonate ($Li_2CO_3$), lithium oxide ($Li_2O$), and lithium hydroxide (LiOH) are produced by the reaction of lithium with the carbon negative electrode and these lithium compounds form a thin film known as Solid Electrolyte Interface (SEI) on the surface of the carbon electrode. In the aging, the secondary battery is left for a preset period for stabilizing the SEI film. The aging may be carried out by exposing the assembled secondary battery to a circumstance at from about 50 Celsius degrees to about 70 Celsius degrees for about 18 hours to about 36 hours. Through the aging, the base material 51' of the sealing tape 50', as illustrated in FIGS. 5 and 6, is shrunk at the vicinity of both ends of the base material 51' of the winding direction of the electrode assembly 20 and the exposed portions 521 are formed on the adhesive layer 52 as illustrated in FIGS. 2 to 4. When the aging is carried out at about 60 Celsius degrees for about 24 hours, the length of the base material is reduced by about 25% to about 33%. Namely, the base material of about 60 mm is shrunk to about 40 mm to about 45 mm long after the aging under the circumstance of about 60 Celsius degrees for about 24 hours. Further, the thickness of the base material 51' of the sealing tape 50' is increased by about 50% to about 75%. Namely, the thickness about 0.060 mm of the base material 51' is reduced to about 0.101 mm after the aging under the circumstance of about 60 Celsius degrees for about 24 hours.

Figure 4B:
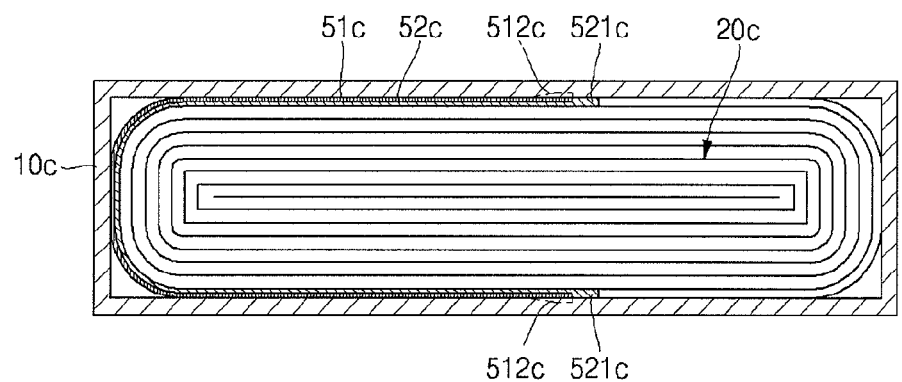
FIG. 4B is a view corresponding to FIG. 4A, but showing an alternative embodiment of the invention.

FIG. 4B is a view corresponding to FIG. 4a and showing an alternative embodiment of the invention. This embodiment is identical to that of FIGS. 1 to 4A, except the cross-section of the secondary battery is generally rectangular, rather than circular. In this embodiment, the electrode assembly has a jelly-roll configuration like that of the first embodiment, except the jelly-roll shape is somewhat flattened in order to match the shape of the can. Although the electrode assembly is less inclined to rotate in the can in this embodiment, the gripping effect provided by the sealing tape is still highly beneficial to the stability of the battery, particularly in the direction of the winding axis of the electrode assembly.

Figure 7:
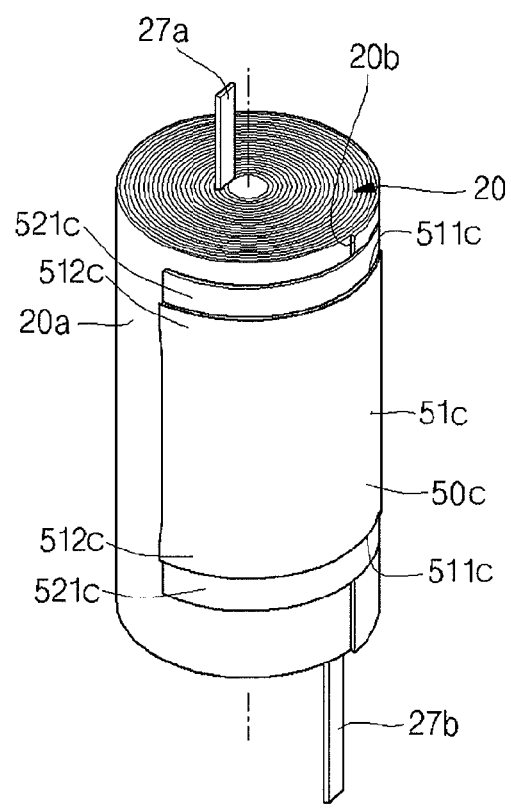
FIG. 7 is a perspective view illustrating an electrode assembly adhered with a sealing tape used for a secondary battery after heating in accordance with another embodiment of the present invention.

FIG. 7 is a perspective view illustrating an electrode assembly adhered with a sealing tape used for a secondary battery after heating the electrode assembly in accordance with another embodiment of the present invention. In FIG. 7, a base material 51c of a sealing tape 50c adhered to the electrode assembly 20 is elongated in a direction substantially perpendicular to a winding direction of the electrode assembly 20. Both ends 511c of the base material 51c are shrunk in the direction substantially perpendicular to the winding directions of the electrode assembly 20 by heating so that shrunk portions 512c become thicker. Furthermore, exposed portions 521c of the adhesive layer 52 are formed outside both ends of the shrunk portions 512c respectively. Since the other elements and their functions are the same or substantially the same as those of the embodiments as illustrated in FIGS. 1 to 6, the detailed description thereof will be omitted.

Figure 8:
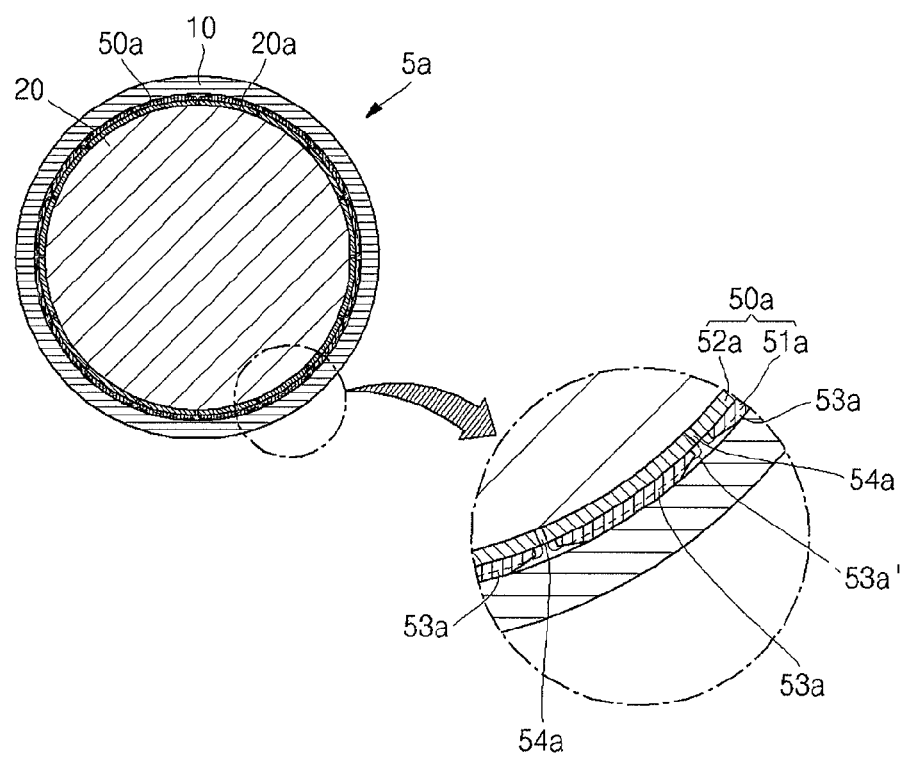
FIG. 8 is a horizontal sectional view illustrating a cylinder type secondary battery according to still another embodiment of the present invention.
Figure 9:
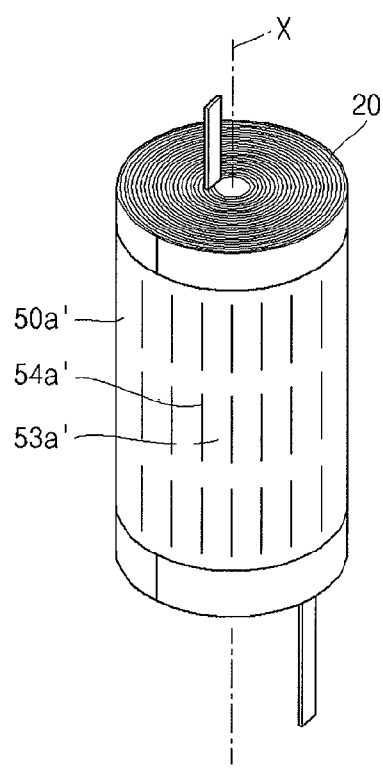
FIG. 9 is a perspective view illustrating an electrode assembly adhered with a sealing tape used for the secondary battery of FIG. 8 before heating.
Figure 10A:
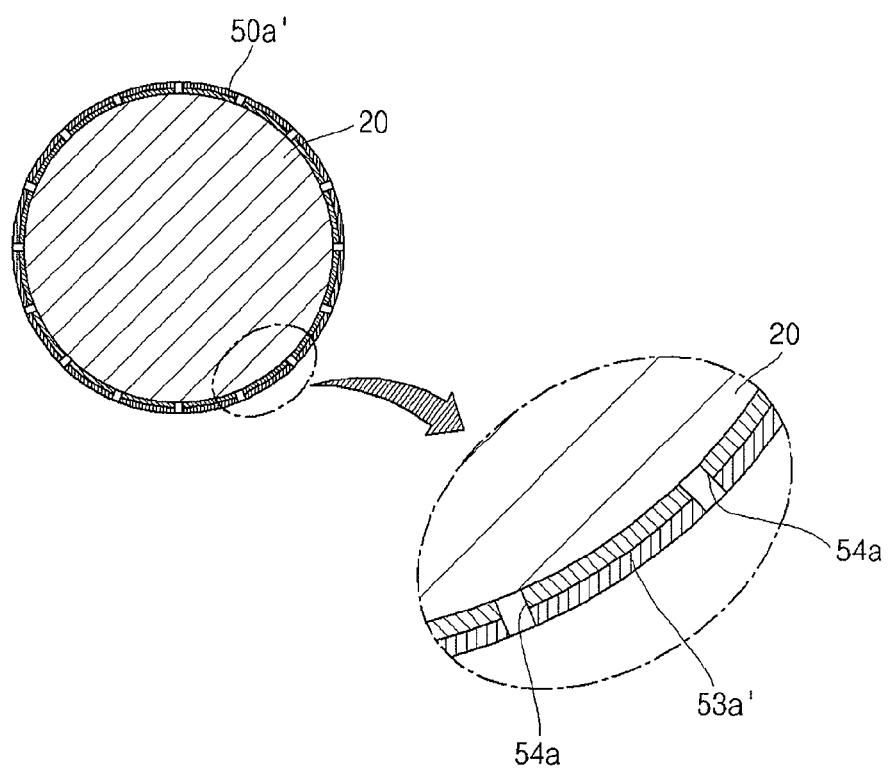
FIGS. 10A and 10B are cross-sectional views through electrode assemblies of variations of a yet further embodiment of the invention prior to heating
Figure 10B:
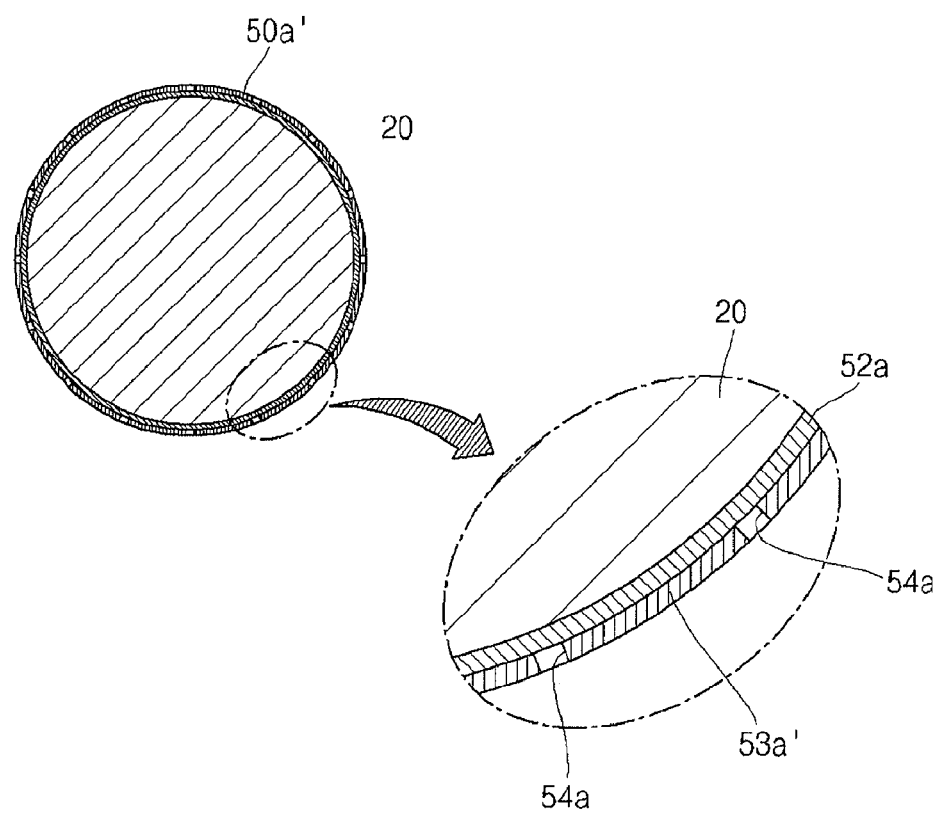

FIG. 8 is a horizontal sectional view illustrating a cylinder type secondary battery according to still another embodiment of the present invention. FIG. 9 is a perspective view illustrating an electrode assembly adhered with a sealing tape used for the secondary battery illustrated in FIG. 8 before heating the electrode assembly. FIGS. 10A and 10B are cross-sectional views through electrode assemblies of variations of a yet further embodiment of the invention prior to heating.

Referring to FIG. 8, a secondary battery 5a includes a sealing tape 50a to surround the entire circumferential surface 20a of an electrode assembly 20 accommodated in a can 10. Since elements except for the sealing tape 50a are the same or substantially the same as those in the embodiments as illustrated in FIGS. 1 to 6, the sealing tape 50a only will be described in detail in this embodiment. Moreover, the sealing tape 50a may be made of the same thermal shrinkage material as that in the embodiments as illustrated in FIGS. 1 to 6.

The sealing tape 50a has a plurality of sections 53a which are separated from each other along the circumference of the electrode assembly 20. The sealing tape 50a includes a base layer 51a and an adhesive layer 52a. In one embodiment, as shown in FIG. 8, the adhesive layer 52a includes a plurality of sub-adhesive layers which are separated by a first plurality of slits. Further, the base layer 51a comprises a plurality of sub-base layers which are separated by a second plurality of slits which are substantially aligned with the first plurality of slits, respectively.

In one embodiment, each of the sub-base layers is so closely contacts an inner surface of the can 10 that the electrode assembly 20 can be restricted from freely moving in the can 10. The base layer 51a closely contact the can 10 by heating. FIGS. 9 and 10 show the electrode assembly 20 around which the sealing tape 50a is wound before heating.

Referring to FIGS. 9 and 10A, the sealing tape 50a has a plurality of slits 54a to be extended parallel to the central axis X of the electrode assembly 20. The slits 54a may be incised or may be formed in the form of a through-hole. The sections 53a are formed between the slits 54a. A plurality of sections 53a is formed in parallel with the central axis X along the circumference of the electrode assembly 20. In one embodiment, when the assembled secondary battery is heated, the base materials 51a of the respective sections 53a are shrunk to widen the slits 54a and deformed to be outwardly convex, so that the base materials 51a contact closely an inner surface 11 of the can 10 as illustrated in FIG. 8. Since the heating may be performed by the same method as that of the embodiment as illustrated in FIGS. 1 to 6, the detailed description will be omitted.

Since, when the slits 54a extend substantially parallel to the central axis X as the embodiment as illustrated in FIGS. 8 to 10, the extension direction of the slits 54a is in substantially parallel with the direction where the electrode assembly is inserted into the can 10 (See FIG. 2), the electrode assembly 20 is easily inserted into the can 10.

FIG. 10B shows a variation of this embodiment prior to heating in which the slits 54a are only formed in the base layer and not in the adhesive layer 52a. Because the base layer has slits, it is still able to deform. The movement in the base layer is accommodated by the inherent resilience of the adhesive.

Figure 11:
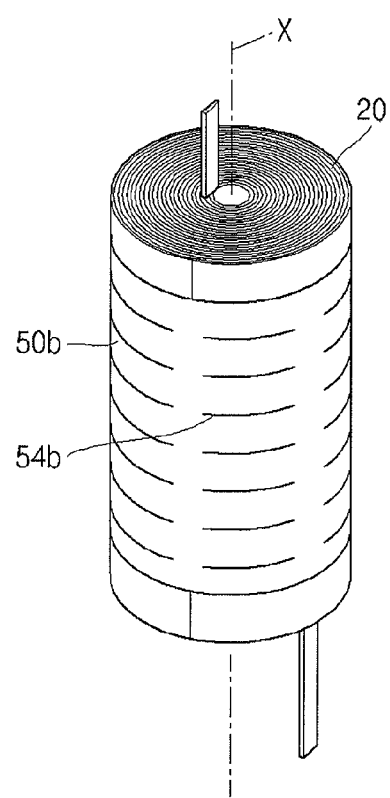
FIG. 11 is a perspective view illustrating an electrode assembly adhered with a sealing tape used for a secondary battery in accordance with still another embodiment of the present invention.

FIG. 11 is a perspective view illustrating an electrode assembly 20 adhered with the sealing tape used for a secondary battery according to still another embodiment of the present invention. Referring to FIG. 11, slits 54b of a sealing tape 50b extend in the circumferential direction of the electrode assembly 20. In a case when the slits 54b of the sealing tape 50b extend in the circumferential direction of the electrode assembly 20, the direction of the slits 54b is approximately perpendicular to the flow direction of the electrolyte so that the electrode assembly 20 can be easily impregnated with the electrolyte. Since other elements except for the slits 54b are the same or substantially the same as those of the embodiment illustrated in FIG. 9, their detailed description will be omitted.

According to at least one embodiment, some of the adhesion layer of the sealing tape is exposed to adhere to an inner surface of the can so that the electrode assembly can be prevented from moving freely in the can.

Further, since the base material of the sealing tape becomes thick by thermal shrinkage, the thick portion of the sealing tape closely adheres to the can. Further, since an adhesive layer of the sealing tape is exposed by the thermal shrinkage of the base material, the exposed portion of the adhesive layer also ensures the firm adherence or contact between the sealing tape and the can. Therefore, the electrode assembly is prevented from freely moving in the can.

Moreover, since the base material of the sealing tape forms curved portions by the thermal shrinkage and the curved portions improve the close adhesion to the can, the free movement of the electrode assembly in the can is prevented.

Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined by the appended claims.

What is claimed is:

1. A secondary battery, comprising:
an electrode assembly comprising an outer surface;
a sealing tape attached to and surrounding at least part of the outer surface of the electrode assembly, wherein the sealing tape comprises i) an adhesive layer contacting the outer surface of the electrode assembly and ii) a base layer formed on and at least partially covering the adhesive layer; and
a can accommodating the electrode assembly and sealing tape, wherein the base layer contacts an inner surface of the can,
wherein the adhesive layer comprises first and second surfaces opposing each other, wherein the first surface contacts the outer surface of the electrode assembly, wherein the second surface comprises two opposing ends which face the inner surface of the can and are not covered by the base layer, and wherein a remaining portion of the second surface of the adhesive layer is covered by the base layer.

2. The secondary battery of claim 1, wherein the base layer comprises a portion which is thicker than the remaining portion of the base layer.

3. The secondary battery of claim 2, wherein the two opposing ends of the adhesive layer are located adjacent to the thicker portion of the base layer.

4. The secondary battery of claim 1, wherein the two ends of the adhesive layer are positioned along a winding direction of the electrode assembly.

5. The secondary battery of claim 1, wherein the two ends of the adhesive layer are positioned along a direction substantially perpendicular to a winding direction of the electrode assembly.

6. The secondary battery of claim 1, wherein an area of the remaining portion of the adhesive layer is substantially greater than an area of the two opposing ends.

7. The secondary battery of claim 1, wherein the base layer comprises at least one of the following: polyethylene terephthalate (PET) and polypropylene (PP).

8. The secondary battery of claim 1, wherein the base layer has a property of thermal shrinkage.

9. The secondary battery of claim 1, wherein the sealing tape covers a finishing part of the electrode assembly.

10. A secondary battery, comprising:
an electrode assembly comprising an outer surface;
a sealing tape attached to and surrounding at least part of the outer surface of the electrode assembly, wherein the sealing tape comprises i) an adhesive layer contacting the outer surface of the electrode assembly and ii) a base layer formed on the adhesive layer, wherein the adhesive layer comprises a plurality of sub-adhesive layers which are separated by a first plurality of slits, wherein the base layer comprises a plurality of sub-base layers which are separated by a second plurality of slits which are substantially aligned with the first plurality of slits, respectively, wherein at least one of the second plurality of slits is wider than the first plurality of slits, and wherein each sub-base layer comprises two opposing ends; and a can accommodating the electrode assembly and sealing tape, wherein the base layer contacts an inner surface of the can.

11. The secondary battery of claim 10, wherein each of the sub-base layers comprises a portion which is thicker than the remaining portion of the respective sub-base layer.

12. The secondary battery of claim 10, wherein each sub-base layer has a first curvature with respect to the can or electrode assembly, and wherein the corresponding sub-adhesive layers have a second curvature different from the first curvature.

13. The secondary battery of claim 10, wherein the base layer has a property of thermal shrinkage.

14. The secondary battery of claim 10, wherein at least part of each sub-base layer is configured to apply a first force against the inner surface of the can, wherein the remaining portion of the respective sub-base layer is configured to apply a second force against the inner surface of the can, and wherein the first force is greater than the second force.

15. The secondary battery of claim 10, wherein each of the sub-base layers is configured to shrink by heat substantially more than the sub-adhesive layers.

16. The secondary battery of claim 10, wherein the base layer comprises at least one of the following: polyethylene terephthalate (PET), polypropylene (PP) and polystyrene (PS).

17. The secondary battery of claim 10, wherein the first and second plurality of slits are substantially perpendicular to a winding direction of the electrode assembly.

18. The secondary battery of claim 10, wherein the first and second plurality of slits are substantially parallel with a winding direction of the electrode assembly.

* * * * *